United States Patent
Schulze

(10) Patent No.: US 10,953,714 B2
(45) Date of Patent: Mar. 23, 2021

(54) MULTI-TRACK MOTOR VEHICLE

(71) Applicant: Hans-Juergen Schulze, Stahnsdorf (DE)

(72) Inventor: Hans-Juergen Schulze, Stahnsdorf (DE)

(*) Notice: Subject to any disclaimer, the term of this patent is extended or adjusted under 35 U.S.C. 154(b) by 92 days.

(21) Appl. No.: 16/464,205

(22) PCT Filed: Nov. 28, 2017

(86) PCT No.: PCT/EP2017/080667
§ 371 (c)(1),
(2) Date: May 24, 2019

(87) PCT Pub. No.: WO2018/096173
PCT Pub. Date: May 31, 2018

(65) Prior Publication Data
US 2019/0389263 A1    Dec. 26, 2019

(30) Foreign Application Priority Data

Nov. 28, 2016   (DE) ..................... 10 2016 223 538.9
Mar. 22, 2017   (DE) ..................... 10 2017 204 853.0

(51) Int. Cl.
*B60G 3/26* (2006.01)
*B62D 7/15* (2006.01)
*B62D 9/02* (2006.01)

(52) U.S. Cl.
CPC ............ *B60G 3/26* (2013.01); *B62D 7/1527* (2013.01); *B60G 2200/464* (2013.01);
(Continued)

(58) Field of Classification Search
CPC ............... B60G 3/26; B60G 2200/464; B60G 2202/422; B60G 2204/148; B62D 7/1527; B62D 9/02; B62D 7/15; B62D 7/14
See application file for complete search history.

(56) References Cited

U.S. PATENT DOCUMENTS 2,576,686 A   11/1951  Kolbe
2,739,658 A    3/1956  Kolbe
(Continued)

FOREIGN PATENT DOCUMENTS

DE   1580128 A1   7/1970
DE   3939312 A1   5/1990
(Continued)

*Primary Examiner* — Darlene P Condra
(74) *Attorney, Agent, or Firm* — Maschoff Brennan

(57) ABSTRACT

It is provided a multiple track and multiple axle motor vehicle, having at least two front wheels, at least two rear wheels, and a steering apparatus which is configured for steering the front and rear wheels of the motor vehicle. The at least two front wheels can be pivoted in each case about a front wheel steering rotational axis by means of the steering apparatus, the front wheel steering rotational axes being oriented in each case in such a way that a negative caster is produced in relation to the respective front wheel, and the at least two rear wheels can be pivoted in each case about a rear wheel steering rotational axis by means of the steering apparatus, the rear wheel steering rotational axes being oriented in each case in such a way that a positive caster is produced in relation to the respective rear wheel.

15 Claims, 3 Drawing Sheets

(52) U.S. Cl.
CPC .. *B60G 2202/422* (2013.01); *B60G 2204/148* (2013.01); *B62D 9/02* (2013.01)

(56) References Cited

U.S. PATENT DOCUMENTS

| | | | |
|---|---|---|---|
| 2,760,785 A | 8/1956 | Kolbe | |
| 2,910,131 A * | 10/1959 | Krotz | B60K 17/30 |
| | | | 180/234 |
| 3,329,233 A | 7/1967 | Kolbe | |
| 3,414,287 A * | 12/1968 | Weiertz | B60G 3/26 |
| | | | 280/5.521 |
| 3,446,513 A * | 5/1969 | Weiertz | B60G 3/265 |
| | | | 280/5.521 |
| 4,756,546 A | 7/1988 | Kubo et al. | |
| 4,973,076 A * | 11/1990 | Fayard | B60G 7/006 |
| | | | 280/5.521 |
| 4,978,131 A | 12/1990 | Edahiro et al. | |
| 5,026,091 A * | 6/1991 | Lee | B62D 17/00 |
| | | | 280/124.106 |
| 5,080,185 A | 1/1992 | Kondo et al. | |
| 5,700,025 A | 12/1997 | Lee | |
| 2006/0151968 A1 | 7/2006 | Kim | |
| 2007/0246901 A1* | 10/2007 | Houser | B62K 5/01 |
| | | | 280/5.521 |
| 2020/0094641 A1* | 3/2020 | Tiramani | B60G 7/02 |

FOREIGN PATENT DOCUMENTS

| | | |
|---|---|---|
| DE | 4030819 A1 | 4/1991 |
| DE | 69520682 T2 | 11/2001 |
| DE | 10 2005 037 973 A1 | 2/2007 |
| DE | 102007024755 A1 | 11/2008 |
| EP | 0893288 B1 | 4/2003 |
| EP | 2418108 A1 | 2/2012 |
| EP | 1997715 B1 | 9/2013 |

\* cited by examiner

MULTI-TRACK MOTOR VEHICLE

CROSS-REFERENCE TO A RELATED APPLICATION

This application is a National Phase Patent Application of International Patent Application Number PCT/EP2017/080667, filed on Nov. 28, 2017, which claims priority of German Patent Application Number 10 2016 223 538.9, filed on Nov. 28, 2016.

BACKGROUND

This disclosure relates to a multiple track and multiple axle motor vehicle.

Motor vehicles of this type are equipped, in particular, with an all wheel steering system which is such that it serves to decrease the turning circle of the vehicle and/or to increase the driving stability, in particular at relatively high driving speeds. One difficulty is that vehicles of this type and also conventional vehicles which are not equipped with an all wheel steering system of this type have the pronounced tendency to lean toward the outside while driving around bends, which can greatly impair the driving stability. In addition, the leaning of the vehicle to the outside frequently induces the vehicle driver to countersteer in a pronounced manner, which can lead to a loss of control over the vehicle precisely at high speeds.

SUMMARY

The problem underlying the proposed solution consists in considerably increasing the stability of a vehicle, in particular when driving around bends.

The problem is solved by way of the provision of a vehicle having features as described herein.

Accordingly, a multiple track and multiple axle motor vehicle is provided, having
  at least two front wheels and at least two rear wheels, and
  a steering apparatus which is configured for steering the front and rear wheels of the motor vehicle,
  it being possible for the at least two front wheels to be pivoted about in each case one front wheel steering rotational axis by means of the steering apparatus, the front wheel steering rotational axes being oriented in each case in such a way that a negative caster is produced in relation to the respective front wheel, and
  it being possible for the at least two rear wheels to be pivoted by means of the steering apparatus about in each case one rear wheel steering rotational axis which is oriented in such a way that a positive caster is produced in relation to the respective rear wheel.

In a deviation from a conventional vehicle, the caster is negative in relation to the front wheels of the vehicle according to the solution (which is, in particular, a four-wheel vehicle) and is positive in relation to the rear wheels.

Said caster geometry brings about stabilization of the vehicle, for example while driving around bends, leaning of the vehicle toward the outside (toward the outer side of the bend) while driving around bends being counteracted, in particular, or even leaning of the vehicle toward the inside (toward the inner side of the bend) being set.

The term "caster" relates to the oblique position of the respective steering rotational axis relative to a perpendicular as viewed in the vehicle longitudinal direction. In particular, the spacing between the wheel contact point (that is to say, a point of the wheel center line which lies on the roadway plane) and the contact point of the respective steering rotational axis (that is to say, the contact point of the steering rotational axis on the roadway) is understood to be the caster. In the case of a negative caster, the contact point of the steering rotational axis is situated behind the wheel contact point (as viewed in the forward driving direction) and, in the case of a positive caster, is situated in front of the wheel contact point.

The "steering rotational axis" is, in particular, that axis about which the respective wheel is rotated in the case of a steering movement which is initiated by a vehicle driver.

As has already been indicated above, the caster in the case of a four-wheel vehicle can of course also be negative in relation to both front wheels, that is to say both front wheels can be pivotable in each case about a front wheel steering rotational axis which is oriented in each case in such a way that a negative caster is produced. Analogously, the caster in relation to both rear wheels can also be positive, that is to say both rear wheels are pivotable in each case about a rear wheel steering rotational axis which is oriented in each case in such a way that a positive caster is produced. It is noted in this context that the solution is not restricted to four-wheel vehicles, however. It is possible, that the vehicle according to the solution has more than two front wheels and/or rear wheels and/or front axles and/or rear axles.

As has likewise already been indicated above, the (in each case, in particular, two) front and rear wheels of the vehicle can be pivotable about the respective front wheel steering rotational axis and rear wheel steering rotational axis in such a way that the vehicle chassis leans toward the inner side of the bend when driving around bends.

The steering rotational axes run, in particular, in such a way that, in the case of pivoting in the same direction of the at least one front wheel and the at least one rear wheel about the respective steering rotational axis, a rotation in the opposite direction of the front and rear wheel about an axis which runs perpendicularly with respect to the vehicle longitudinal direction takes place.

Moreover, the vehicle according to the solution can have a purely passive chassis. In particular, the chassis does not comprise any actuators at all which produce leaning of the vehicle chassis toward the inner side of the bend while driving around bends. Here, the abovementioned leaning of the vehicle toward the inner side of the bend results solely from the steering geometry (negative caster at the front, positive caster at the rear), in particular as viewed in the driving direction in the case of an opposite steering lock of the front and rear wheels, and can correspondingly be implemented in a comparatively simple way.

As a consequence of the negative caster in relation to the front wheel, leaning of the front wheel toward the outer side of the bend about an axis which runs parallel to the vehicle longitudinal axis can be set in the case of pivoting of the front wheel about the front wheel steering rotational axis, that is to say when driving around bends. This applies correspondingly to the rear wheel.

The vehicle according to the solution has a positive scrub radius or a scrub radius of zero, in particular, in relation to the front and/or rear wheels.

In accordance with another development of the solution, the front wheels are attached in each case via a wheel axle to a steering knuckle which can be pivoted about the front wheel steering rotational axes, and the rear wheels are likewise attached in each case via a wheel axle to a steering knuckle which can be pivoted about the rear wheel steering rotational axes.

The motor vehicle additionally may have at least one first track rod, via which at least two of the front wheels are coupled to a steering gear, and/or a second track rod, via which at least two of the rear wheels are coupled to a steering gear. It is possible that the first track rod runs at least approximately parallel to the second track rod. In the case of this configuration, in particular, the two front wheels are coupled to one another via the first track rod and the rear wheels are coupled to one another via the second track rod.

It is also possible, however, that the first track rod runs obliquely with respect to the second track rod, a front wheel being coupled to a diagonally opposite rear wheel, in particular via the first track rod, and the other front wheel being coupled to the other rear wheel via the second track rod (that is to say, there is an X-shaped arrangement of the track rods).

It is conceivable that the track rods extend continuously from the one wheel as far as the other wheel. It is also possible, however, that the first and/or the second track rod consist/consists of part segments, a first part segment, for example, running from the one wheel as far as the steering gear, and a second part segment running from the steering gear as far as the other wheel.

It is also possible that the first track rod is coupled at least to one of the front wheels via a track rod arm which can be pivoted about the front wheel steering rotational axis and/or the second track rod is coupled at least to one of the rear wheels via a track rod arm which can be pivoted about the rear wheel steering rotational axis. The track rod arms can be provided both in the parallel configuration (first track rod runs parallel to the second track rod) or else in the crossed configuration (first track rod runs obliquely with respect to the second track rod).

Moreover, it is conceivable that the caster of the front and rear wheel of the vehicle is selected in such a way that the center point of a circular path which the vehicle describes when driving around bends lies between a front axle and a rear axle of the vehicle. In particular, the center point of the circular path does not lie on an extension of a rear axle of the vehicle, as in the case of most conventional vehicles.

It is possible, in particular, that the magnitude of the caster of the front wheel differs from the magnitude of the caster of the rear wheel; for example, in order to set a defined position of the abovementioned center point of the circular path in relation to the front and rear axle when driving around bends. It is of course also possible, however, that the magnitude of the caster of the front wheel corresponds at least approximately to the magnitude of the caster of the rear wheel.

The motor vehicle according to the solution can additionally have a setting device for setting the caster in relation to the at least one front wheel and/or for setting the caster in relation to the at least one rear wheel. The center point of the abovementioned circular path of the vehicle when driving around bends can be set via the setting of the caster. The setting device comprises, in particular, actuators, by way of which, the orientation of the steering rotational axes can be changed.

It is also conceivable that the at least one front and/or rear wheel of the vehicle have/has a positive camber in relation to straight ahead driving of the vehicle. The wheels therefore in each case have an inclination toward the outside in a starting position, that is to say the wheel center plane is inclined to the outside (away from a center line of the vehicle in the vehicle longitudinal direction) with respect to a perpendicular which runs through the wheel contact point. It is also possible, however, that the front and/or rear wheel have/has a negative camber, that is to say the wheels are inclined toward the inside (toward the vehicle center line) in a starting position. Moreover, the vehicle can also have a device for changing the camber of the wheels, for example in the form of corresponding actuators (cf., for example, document DE 10 2005 037 973 A1, the content of which is incorporated in this context).

BRIEF DESCRIPTION OF THE DRAWINGS

In the following text, the solution will be described in greater detail using embodiments with reference to the figures.

DETAILED DESCRIPTION

Figure 1:
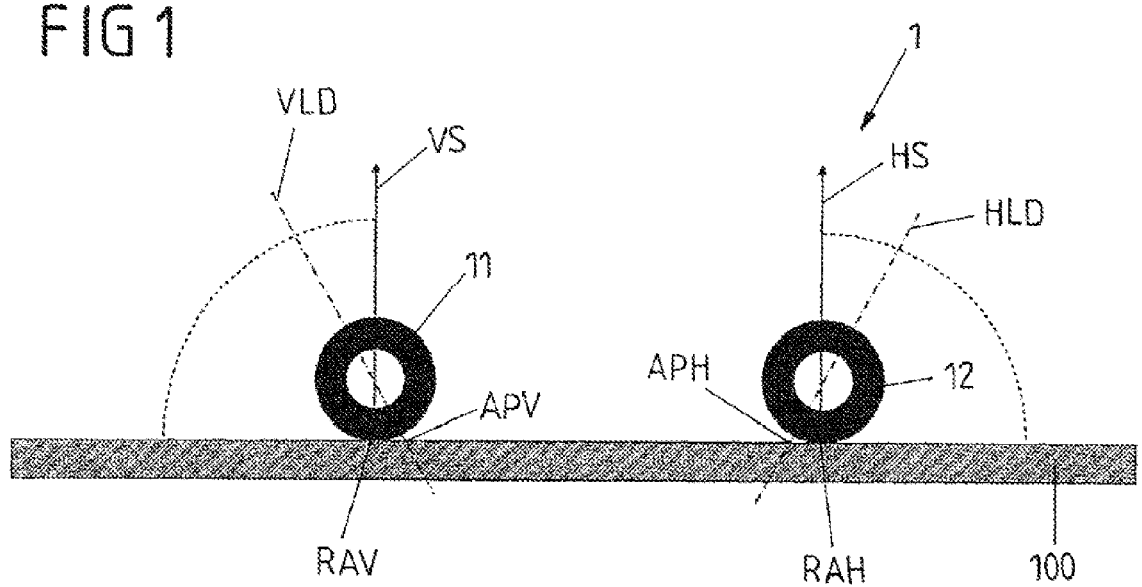
FIG. 1 shows an illustration for describing the caster geometry of a vehicle according to the solution.

FIG. 1 diagrammatically shows a side view of wheels (front wheels 11 and rear wheels 12) of a vehicle 1 according to the solution. The vehicle 1 is equipped with an all wheel steering apparatus, that is to say both the front wheels 11 and the rear wheels 12 can perform a steering pivoting movement, in order to initiate driving around bends. Thus, in the case of a steering movement which is generated by a vehicle driver, the front wheels 11 are pivoted in each case about a front wheel steering rotational axis VLD, whereas the rear wheels 12 can be pivoted about in each case one rear wheel steering rotational axis HLD. The front wheels 11 lie on a roadway 100 at a front wheel contact point RAV, and the rear wheels 12 lie on a roadway 100 at a rear wheel contact point RAH.

As viewed in the forward driving direction, the respective front wheel steering rotational axis VLD is inclined toward the front relative to a perpendicular VS which runs perpendicularly with respect to the roadway plane 100 and through the front wheel contact point RAV, with the result that said respective front wheel steering rotational axis VLD makes contact with the roadway 100 behind the wheel contact point RAV (at a contact point APV). This correspondingly results in a negative caster in relation to the front wheels 11, that is to say the contact point APV of the front wheel steering rotational axis VLD lies behind the wheel contact point RAV.

The respective rear wheel steering rotational axis HLD is inclined toward the rear with respect to a perpendicular HS which runs through the rear wheel contact point RAH, that is to say the rear wheel steering rotational axis HLD makes contact with the roadway 100 in each case in front of the wheel contact point RAH of the rear wheels 12 (at a contact point APH). There is accordingly a positive caster in relation to the rear wheels 12.

The vehicle 1 according to the solution therefore has a geometry which differs considerably in comparison with a conventional vehicle, in relation to the caster of the front and rear wheels. Said special caster geometry stabilizes the vehicle when driving through bends, as has already been described above.

Figure 2:
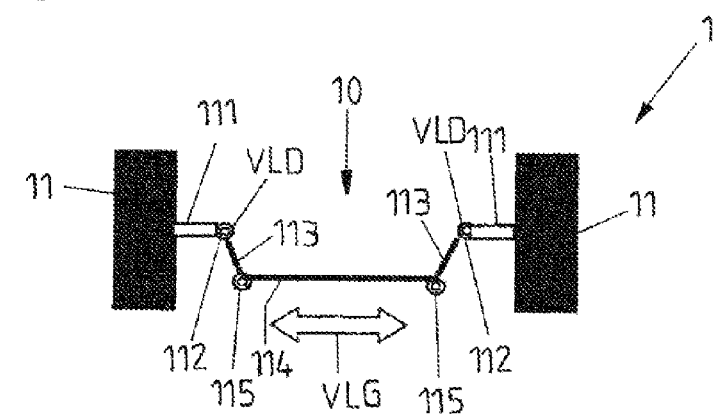
FIG. 2 diagrammatically shows constituent parts of a steering apparatus of a vehicle according to the solution in plan view.
Figure 2:
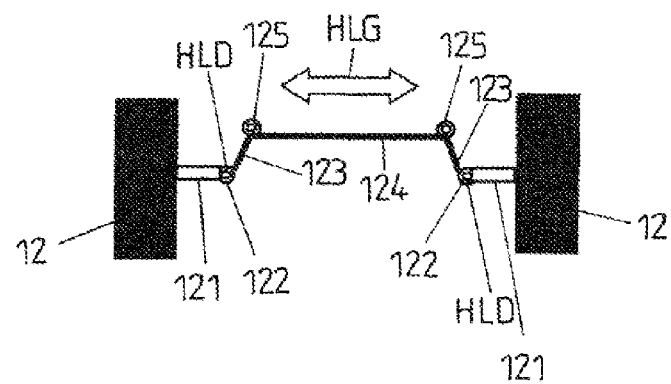

FIG. 2 diagrammatically shows constituent parts of a steering apparatus 10 of a vehicle 1 according to the solution in plan view. The steering apparatus 10 thus comprises two front steering knuckles which are connected via wheel axles 111 to the front wheels 11, for example to a wheel hub. Moreover, the wheel axles 111 are connected pivotably to a vehicle chassis (not shown) via joints 112 which configure the front wheel steering rotational axis VLD, to be precise in such a way that they can be pivoted together with the front wheels 11 about the respective front wheel steering rotational axis VLD.

Moreover, the wheel axles 111 of the steering knuckles of the vehicle are coupled via track rod arms 113 to a first (front) track rod 114. The wheel axles 111 are as a rule connected in each case to the track rod arms 113 in such a way that the orientation of the wheel axles 111 and the track rod arms 113 with respect to one another is fixed. For example, the wheel axles 111 and the track rod arms 113 run approximately perpendicularly with respect to one another. The track rod arms 113 are articulated in each case on one side together with the wheel axles 111 on the vehicle chassis (for example, via the joints 112) and via joints 115 at ends of the track rod 114.

A pivoting movement of the track rod arms 113 and therefore of the wheel axles 111 and therefore of the front wheels 11 about the front wheel steering rotational axis VLD is generated by way of a (for example, rectilinear) movement of the track rod 114, in particular in the vehicle transverse direction. The movement of the track rod 114 takes place, in particular, via a front steering gear VLG.

Moreover, in relation to the rear wheels 12, in an analogous manner with respect to the front wheels 11, the steering apparatus 10 has wheel axles 121 of the rear steering knuckles of the vehicle, track rod arms 123 and a second (rear) track rod 124. The rear wheel axles 121 are articulated on the vehicle chassis (not shown) via joints 122 which configure the rear wheel steering rotational axes HLD, and can be pivoted about in each case the rear wheel steering rotational axes HLD in an analogous manner with respect to the front wheels 11, it being possible for the pivoting movement to be generated by way of a movement of the rear track rod 124 in the vehicle transverse direction. The movement of the rear track rod 124 is generated, for example, via a rear steering gear HLD.

Figure 3:
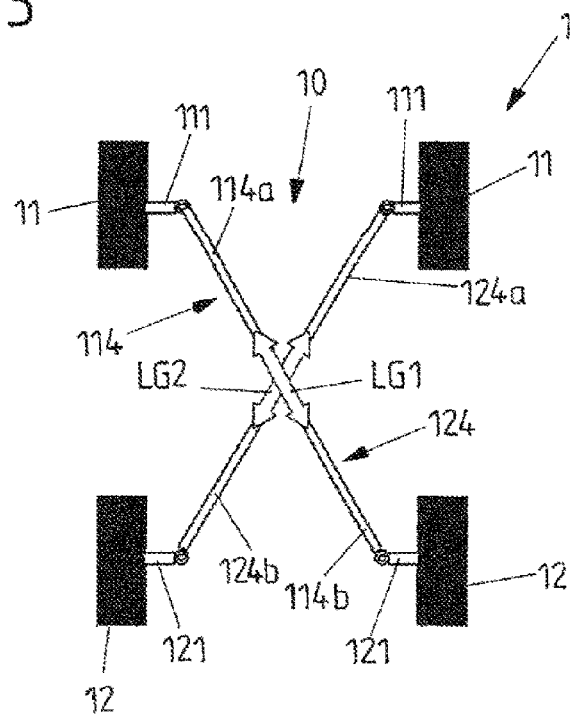
FIG. 3 shows an alternative embodiment of the steering apparatus.

FIG. 3 relates to an alternative embodiment of the steering apparatus 10. Here, the track rods 114, 124 do not connect the two front wheels 11 and rear wheels 12 of the vehicle 1 to one another. Rather, the track rods 114, 124 are arranged in a crossed manner, the first track rod 114 running diagonally and connecting one of the front wheels 11 to a rear wheel 12 which is arranged on the other vehicle side, and the second track rod 124 connecting the other front wheel to the other rear wheel.

The generation of a pivoting movement of the front and rear wheels 11, 12 about the respective steering rotational axis VLD, HLD takes place, for example, in an analogous manner with respect to FIG. 2 by way of a linear movement of the track rods 114, 124 by means of steering gears LG1, LG2. It is conceivable that the track rods 114, 124 are in each case of continuous configuration, that is to say run from the respective track rod arm 113 of the front wheel 11 as far as the track rod arm 123 of the rear wheel 12. It is also possible, however, that the track rods 114, 124 are in each case of multiple-piece (for example, two-piece) configuration. For example, the first track rod 114 comprises a part segment 114a which runs from the front wheel 11 as far as the steering gear LG1, and a second part segment 114b which extends from the steering gear LG1 as far as the rear wheel 12. In a corresponding manner, the second track rod 124 can also have part segments 124a, 124b. For example, a steering lock in opposite directions of the front and rear wheels 11, 12 might be generated by way of a multiple-piece nature of this type of the track rods 114, 124.

Figure 4:
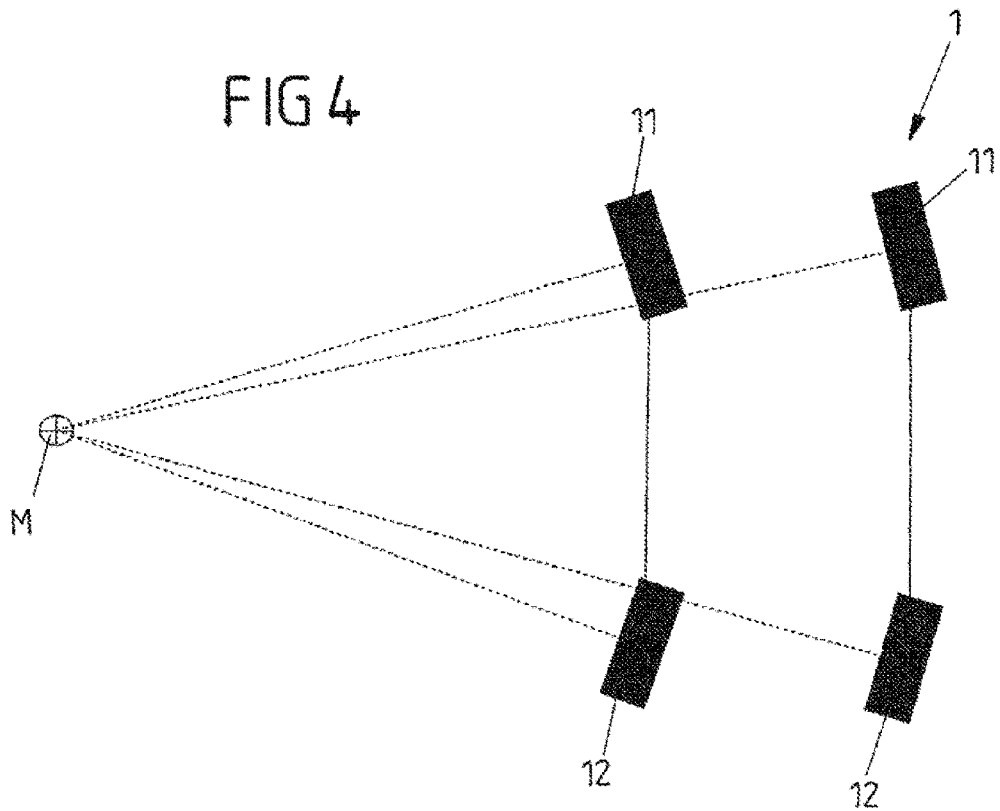
FIG. 4 diagrammatically shows a plan view of a vehicle according to the solution while driving around bends.

For further explanation of the steering geometry of the vehicle according to the solution, FIG. 4 shows the position of the front and rear wheels 11, 12 of the vehicle 1 while driving through bends. Here, the front and rear wheels 11, 12 have been pivoted in each case in opposite directions about the respective steering rotational axes, a rotation in opposite directions of the front and rear wheels 11, 12 in relation to an axis which runs perpendicularly with respect to the vehicle longitudinal axis resulting, however, on account of the orientation of the steering rotational axes. Thus, in accordance with FIG. 4, the front wheels 11 are turned to the left and the rear wheels 12 are turned to the right.

While driving around bends, the vehicle 1 describes a circular path about a center point M. On account of the special steering geometry of the vehicle according to the solution, the center point M is not situated, as in the case of a vehicle without all wheel steering, at the level of a rear axle, that is to say an axle which runs through the rear wheels in the vehicle transverse direction, but rather between a front axle and a rear axle of the vehicle, that is to say in a central region of the vehicle in relation to the vehicle longitudinal direction. Therefore, the center point M can be situated at in principle any desired positions between the front axle and the rear axle, which results in a greater scope for the design of the steering apparatus.

It is conceivable that the position of the center point M can be changed via an adjustment of the caster of the front and/or the rear wheels 11, 12. The vehicle according to the solution may comprise a setting device, by way of which the orientation of the respective steering rotational axis and therefore the respective caster can be adjusted.

Figure 5:
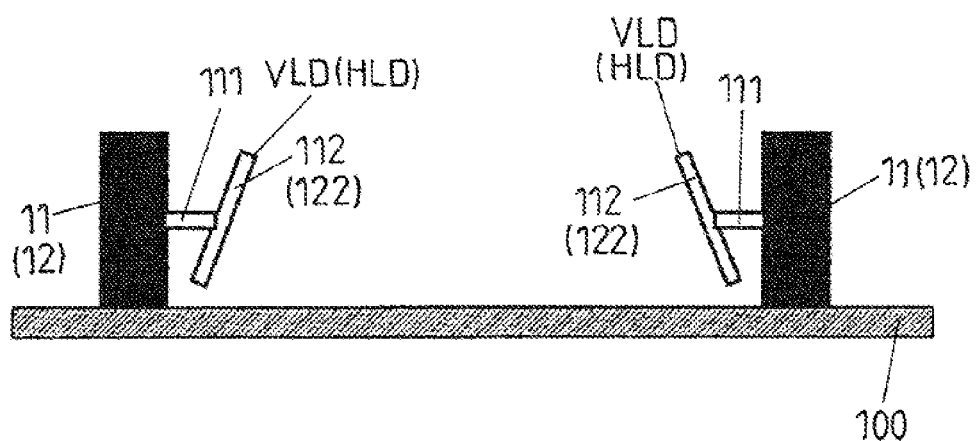
FIG. 5 diagrammatically shows a view from the front of a vehicle according to the solution.
Figure 6:
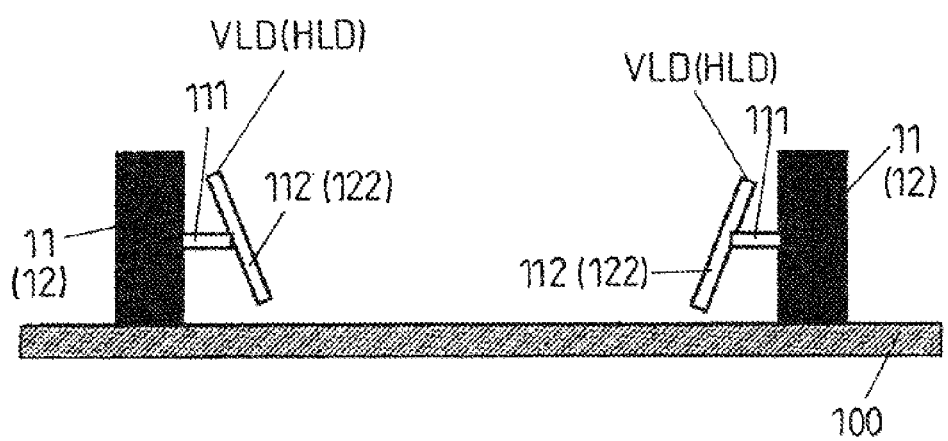
FIG. 6 diagrammatically shows a view from the front of a vehicle according to the solution with an alternative embodiment of the steering apparatus.

FIG. 5 shows a possible configuration of the camber of the front wheels 11 (or rear wheels 12) of the vehicle according to the solution, according to which the front wheel steering rotational axes VLD (joint 112) or the rear wheel steering rotational axes HLD (joint 122) do not run perpendicularly with respect to the wheel axle 111 (121), but rather are inclined in a plane which runs perpendicularly with respect to the vehicle transverse axis, in such a way that their upper ends are further away from the respective wheel than their lower ends (in accordance with a positive camber of the wheels 11, 12). As an alternative, the front wheel steering rotational axes VLD (112) or the rear wheel steering rotational axes HLD (122) can be inclined in the opposite manner (cf. FIG. 6), which corresponds to a negative camber of the wheels 11 (12).

The invention claimed is:

1. A multiple track and multiple axle motor vehicle, having:
   at least two front wheels,
   at least two rear wheels, and
   a steering apparatus which is configured for steering the at least two front wheels and the at least two rear wheels of the motor vehicle, wherein:
      the at least two front wheels can be pivoted in each case about a front wheel steering rotational axis by means of the steering apparatus, the front wheel steering rotational axes being oriented in each case in such a way that a negative caster is produced in relation to the respective front wheel, and the at least two rear wheels can be pivoted in each case about a rear wheel steering rotational axis by means of the steering apparatus, the rear wheel steering rotational axes being oriented in each case in such a way that a positive caster is produced in relation to the respective rear wheel.

2. The motor vehicle as claimed in claim 1, wherein the at least two front wheels can be pivoted with respect to the at least two rear wheels in an opposed manner such that the vehicle chassis leans in each case toward the inner side of the bend when driving around bends as a consequence of a steering movement.

3. The motor vehicle as claimed in claim 1, further comprising a purely passive chassis.

4. The motor vehicle as claimed in claim 1, wherein the at least two front wheels are attached in each case via a wheel axle to a steering knuckle which can be pivoted about the respective front wheel steering rotational axis, and/or the at least two rear wheels are attached in each case via a wheel axle to a steering knuckle which can be pivoted about the respective rear wheel steering rotational axis.

5. The motor vehicle as claimed in claim 1, further comprising at least one first track rod, via which at least one of the at least two front wheels is coupled to a steering gear, and/or at least one second track rod, via which at least one of the at least two rear wheels is coupled to a steering gear.

6. The motor vehicle as claimed in claim 5, wherein the first track rod runs at least approximately parallel to the second track rod.

7. The motor vehicle as claimed in claim 5, wherein the first track rod runs obliquely with respect to the second track rod.

8. The motor vehicle as claimed in claim 7, wherein one of the at least two front wheels is coupled via the first track rod to one of the at least two rear wheels, and the other front wheel is coupled to the other rear wheel via the second track rod.

9. The motor vehicle as claimed in claim 5, wherein the first track rod is coupled at least to one of the at least two front wheels via a track rod arm which can be pivoted about the front wheel steering rotational axis, and/or the second track rod is coupled at least to one of the at least two rear wheels via a track rod arm which can be pivoted about the rear wheel steering rotational axis.

10. The motor vehicle as claimed in claim 1, wherein the front wheel steering rotational axes and the rear wheel rotational axes are oriented in such a way that the at least two front wheels and the at least two rear wheel leans toward the outer side of the bend in the case of driving around bends which is initiated by way of pivoting of the at least two front wheels and the at least two rear wheel.

11. The motor vehicle as claimed in claim 1, wherein the caster of the at least two front wheels and the at least two rear wheels is selected in such a way that the center point of a circular path which is described by the vehicle when driving around bends lies between a front and rear axle of the vehicle.

12. The motor vehicle as claimed in claim 1, wherein the magnitude of the caster of the at least two front wheels differs from the magnitude of the caster of the at least two rear wheels.

13. The motor vehicle as claimed in claim 1, further comprising a setting device for setting the caster in relation to the at least two front wheels and/or for setting the caster in relation to the at least two rear wheels.

14. The motor vehicle as claimed in claim 1, wherein the at least two front wheels and/or the at least two rear wheels have a positive camber in relation to straight ahead driving of the vehicle.

15. The motor vehicle as claimed in claim 1, wherein the at least two front wheels and/or the at least two rear wheels have a negative camber in relation to straight ahead driving of the vehicle.

* * * * *